United States Patent
Opshaug et al.

(10) Patent No.: US 9,485,619 B1
(45) Date of Patent: Nov. 1, 2016

(54) MOBILE DEVICE POSITIONING USING A VARIABLE BANDWIDTH PILOT SIGNAL

(71) Applicant: QUALCOMM Incorporated, San Diego, CA (US)

(72) Inventors: Guttorm Opshaug, Redwood City, CA (US); Tianqi Wang, Sunnyvale, CA (US); Shenqiu Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/012,377

(22) Filed: Feb. 1, 2016

(51) Int. Cl.
   *H04W 24/00* (2009.01)
   *H04W 4/02* (2009.01)
   *H04L 5/00* (2006.01)

(52) U.S. Cl.
   CPC .............. *H04W 4/02* (2013.01); *H04L 5/0007* (2013.01)

(58) Field of Classification Search
   CPC .. H04W 64/00; H04W 4/02; H04L 29/08657
   USPC ...................... 455/456.1, 456.2, 404.2, 414.2
   See application file for complete search history.

(56) References Cited

U.S. PATENT DOCUMENTS

| 9,084,127 B2 | 7/2015 | Lim et al. | |
| 2003/0114170 A1* | 6/2003 | Rick | G01S 5/0257 455/456.1 |
| 2005/0227706 A1* | 10/2005 | Syrjarinne | G01S 5/10 455/456.1 |
| 2011/0177827 A1* | 7/2011 | Crilly, Jr. | H04W 52/143 455/456.1 |
| 2012/0170458 A1 | 7/2012 | Zee et al. | |
| 2015/0172947 A1 | 6/2015 | Dalsgaard et al. | |

FOREIGN PATENT DOCUMENTS

| KR | 20140138617 A | 12/2014 |
| WO | 2014112916 A1 | 7/2014 |

* cited by examiner

*Primary Examiner* — Nghi H Ly
(74) *Attorney, Agent, or Firm* — Hunter Clark PLLC (57) ABSTRACT

A mobile device position determination method includes: determining a plurality of bandwidths of a pilot signal corresponding to different times at which the pilot signal is received by a mobile device from a base station, the plurality of bandwidths of the pilot signal including a first bandwidth corresponding to a first time at which the pilot signal is received and a second bandwidth corresponding to a second time at which the pilot signal is received, the second time being after the first time; filtering the pilot signal using the second bandwidth; determining a positioning parameter from the pilot signal filtered using the second bandwidth; and determining a position of the mobile device using the positioning parameter.

24 Claims, 4 Drawing Sheets

MOBILE DEVICE POSITIONING USING A VARIABLE BANDWIDTH PILOT SIGNAL

BACKGROUND

As the use of mobile devices has proliferated, so too have computer applications using the location of the mobile devices. The location of mobile devices may be determined in a variety of ways. For example, in terrestrial downlink positioning (TDP), pilot signals from base stations may be measured to determine one or more positioning parameters. The positioning parameter(s) may in turn be used to determine a location of the mobile device, e.g., using multilateration techniques. The accuracy of the determined position of the mobile device often depends on the accuracy with which the positioning parameter(s) is(are) determined.

SUMMARY

An example of a mobile device position determination method includes: determining a plurality of bandwidths of a pilot signal corresponding to different times at which the pilot signal is received by a mobile device from a base station, the plurality of bandwidths of the pilot signal including a first bandwidth corresponding to a first time at which the pilot signal is received and a second bandwidth corresponding to a second time at which the pilot signal is received, the second time being after the first time; filtering the pilot signal using the second bandwidth; determining a positioning parameter from the pilot signal filtered using the second bandwidth; and determining a position of the mobile device using the positioning parameter.

Implementations of such a method may include one or more of the following features. The base station is a first base station, the pilot signal is a first pilot signal, the plurality of bandwidths of the pilot signal is a first plurality of bandwidths of the first pilot signal, and the positioning parameter is a first positioning parameter, the method further including: determining a second plurality of bandwidths of a second pilot signal corresponding to different times at which the second pilot signal is received by the mobile device from a second base station, the second plurality of bandwidths of the second pilot signal including a third bandwidth corresponding to a third time at which the second pilot signal is received and a fourth bandwidth corresponding to a fourth time at which the second pilot signal is received, the fourth time being after the third time; filtering the second pilot signal by the mobile device using the fourth bandwidth; and determining a second positioning parameter from the second pilot signal filtered using the fourth bandwidth; where determining the position of the mobile device further includes using the second positioning parameter. Determining the first plurality of bandwidths of the first pilot signal includes: measuring the first pilot signal to obtain a measured pilot signal; and analyzing the measured pilot signal. Measuring the first pilot signal includes filtering the first pilot signal using different bandwidths to obtain a plurality of filtered pilot signals and wherein the analyzing comprises correlating at least one pair of the plurality of filtered pilot signals. The pilot signal is an orthogonal frequency-division multiplexed (OFDM) cell-specific reference signal (CRS). The plurality of bandwidths of the pilot signal includes at least one further bandwidth corresponding to at least one further time, the at least one further bandwidth being other than the first bandwidth or the second bandwidth, and the second time being a most recent time of the first time, the second time, and the at least one further time.

An example of a mobile device includes: a receiver configured to receive pilot signals of different bandwidths; a processor communicatively coupled to the receiver and configured to: determine a plurality of bandwidths of a pilot signal received from a base station by the receiver at different times, the plurality of bandwidths of the pilot signal including a first bandwidth corresponding to a first time at which the pilot signal is received and a second bandwidth corresponding to a second time at which the pilot signal is received, the second time being after the first time; filter the pilot signal using the second bandwidth; determine a positioning parameter from the pilot signal filtered using the second bandwidth; and determine a position of the mobile device using the positioning parameter.

Implementations of such a mobile device may include one or more of the following features. The base station is a first base station, the pilot signal is a first pilot signal, the plurality of bandwidths of the pilot signal is a first plurality of bandwidths of the pilot signal, and the positioning parameter is a first positioning parameter, the receiver being configured to receive pilot signals from the first base station and a second base station that is physically separate from the first base station, the processor being further configured to: determine a second plurality of bandwidths of a second pilot signal corresponding to different times at which the second pilot signal is received by the mobile device from the second base station, the second plurality of bandwidths of the second pilot signal including a third bandwidth corresponding to a third time at which the second pilot signal is received and a fourth bandwidth corresponding to a fourth time at which the second pilot signal is received, the fourth time being after the third time; filter the second pilot signal using the fourth bandwidth; and determine a second positioning parameter from the second pilot signal filtered using the fourth bandwidth; where to determine the position of the mobile device, the processor is further configured to use the second positioning parameter. To determine the first plurality of bandwidths of the first pilot signal, the processor is configured to analyze a characteristic of the first pilot signal. To determine the first plurality of bandwidths of the first pilot signal, the processor is configured to: filter the first pilot signal using at least two predetermined bandwidths to produce at least two filtered signals; determine the characteristic of the at least two filtered signals; and correlate the characteristic of each filtered signal of at least one pair of the at least two filtered signals. The pilot signal is an orthogonal frequency-division multiplexed (OFDM) cell-specific reference signal (CRS). The plurality of bandwidths of the pilot signal includes at least one further bandwidth corresponding to at least one further time, the at least one further bandwidth being other than the first bandwidth or the second bandwidth, and the second time being a most recent time of the first time, the second time, and the at least one further time.

An example of a non-transitory processor-readable storage medium stores processor-readable instructions configured to cause a processor to: determine a plurality of bandwidths of a pilot signal received from a base station by a mobile device at different times, the plurality of bandwidths of the pilot signal including a first bandwidth corresponding to a first time at which the pilot signal is received and a second bandwidth corresponding to a second time at which the pilot signal is received, the second time being after the first time; filter the pilot signal using the second bandwidth; determine a positioning parameter from the pilot signal filtered using the second bandwidth; and determine a position of the mobile device using the positioning parameter.

Implementations of such a storage medium may include one or more of the following features. The base station is a first base station, the pilot signal is a first pilot signal, the plurality of bandwidths of the pilot signal is a first plurality of bandwidths of the pilot signal, and the positioning parameter is a first positioning parameter, the instructions further comprising instructions configured to cause the processor to: determine a second plurality of bandwidths of a second pilot signal corresponding to different times at which the second pilot signal is received by the mobile device from a second base station physically separate from the first base station, the second plurality of bandwidths of the second pilot signal including a third bandwidth corresponding to a third time at which the second pilot signal is received and a fourth bandwidth corresponding to a fourth time at which the second pilot signal is received, the fourth time being after the third time; filter the second pilot signal using the fourth bandwidth; and determine a second positioning parameter from the second pilot signal filtered using the fourth bandwidth; where to determine the position of the mobile device, the processor is further configured to use the second positioning parameter. To determine the first plurality of bandwidths of the first pilot signal, the instructions include instructions configured to cause the processor to analyze a characteristic of the first pilot signal. To determine the first plurality of bandwidths of the first pilot signal, the instructions include instructions configured to cause the processor to: filter the first pilot signal using at least two predetermined bandwidths to produce at least two filtered signals; determine the characteristic of the at least two filtered signals; and correlate the characteristic of each filtered signal of at least one pair of the at least two filtered signals. The pilot signal is an orthogonal frequency-division multiplexed (OFDM) cell-specific reference signal (CRS). The plurality of bandwidths of the pilot signal includes at least one further bandwidth corresponding to at least one further time, the at least one further bandwidth being other than the first bandwidth or the second bandwidth, and the second time being a most recent time of the first time, the second time, and the at least one further time.

An example of a system includes: means for determining a plurality of bandwidths of a pilot signal corresponding to different times at which the pilot signal is received by a mobile device from a base station, the plurality of bandwidths of the pilot signal including a first bandwidth corresponding to a first time at which the pilot signal is received and a second bandwidth corresponding to a second time at which the pilot signal is received, the second time being after the first time; means for filtering the pilot signal by the mobile device using the second bandwidth; means for determining a positioning parameter from the pilot signal filtered using the second bandwidth; and means for determining a position of the mobile device using the positioning parameter.

Implementations of such a system may include one or more of the following features. The base station is a first base station, the pilot signal is a first pilot signal, the plurality of bandwidths of the pilot signal is a first plurality of bandwidths of the pilot signal, and the positioning parameter is a first positioning parameter, the system further comprising: means for determining a second plurality of bandwidths of a second pilot signal corresponding to different times at which the second pilot signal is received by the mobile device from a second base station, the second plurality of bandwidths of the second pilot signal including a third bandwidth corresponding to a third time at which the second pilot signal is received and a fourth bandwidth corresponding to a fourth time at which the second pilot signal is received, the fourth time being after the third time; means for filtering the second pilot signal by the mobile device using the fourth bandwidth; and means for determining a second positioning parameter from the second pilot signal filtered using the fourth bandwidth; where the means for determining the position of the mobile device use the second positioning parameter. The means for determining the first plurality of bandwidths of the first pilot signal comprise: means for measuring the first pilot signal to obtain a measured pilot signal; and means for analyzing, at the mobile device, the measured pilot signal. At least one of the means for measuring or the means for analyzing comprise means for filtering the first pilot signal using different bandwidths to obtain a plurality of filtered pilot signals, and the means for analyzing comprise means for correlating at least one pair of the plurality of filtered pilot signals. The pilot signal is an orthogonal frequency-division multiplexed (OFDM) cell-specific reference signal (CRS). The plurality of bandwidths of the pilot signal includes at least one further bandwidth corresponding to at least one further time, the at least one further bandwidth being other than the first bandwidth or the second bandwidth, and the second time being a most recent time of the first time, the second time, and the at least one further time.

DETAILED DESCRIPTION

Techniques are discussed herein for determining position of a mobile device. For example, position of a mobile device may be determined from OFDM pilot signals whose bandwidth may change over time. The mobile device may receive pilot signals from base stations and determine the bandwidths of these pilot signals. The determined bandwidths may be used to receive further pilot signals from which one or more positioning parameters are determined. The positioning parameter(s) is(are) used to determine the position of the mobile device. The determination of the bandwidths may be repeated. The mobile device may intermittently, e.g., periodically are regular, consistent intervals, determine the bandwidths of the pilot signals. The mobile device may use more recent, e.g., the most recent, bandwidths determined for the pilot signals to determine the positioning parameter(s) corresponding to the pilot signals. Thus, the mobile device may determine changed bandwidths of one or more of the pilot signals and adjust how the pilot signals are received using the newly-determined bandwidths. Also or alternatively, a server may determine one or more of the bandwidths, e.g., by having information regarding the pilot signals received at the mobile device provided to the server. The server may provide the determined bandwidths to the mobile device for use in receiving further pilot signals. The server may also or alternatively determine the position of the mobile device, e.g., if positioning parameter information is provided to the server. These examples, however, are not exhaustive.

Items and/or techniques described herein may provide one or more of the following capabilities, as well as other capabilities not mentioned. Base station pilot signals, such as cell-specific reference signals, may be measured using less power than measuring other signals for determining mobile device position. Current bandwidths of base station pilot signals whose bandwidths have changed may be detected such that pilot signals analyzed for position determination are received using a corresponding bandwidth to help avoid noise, help avoid signal measurement errors, and help improve position determination accuracy. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
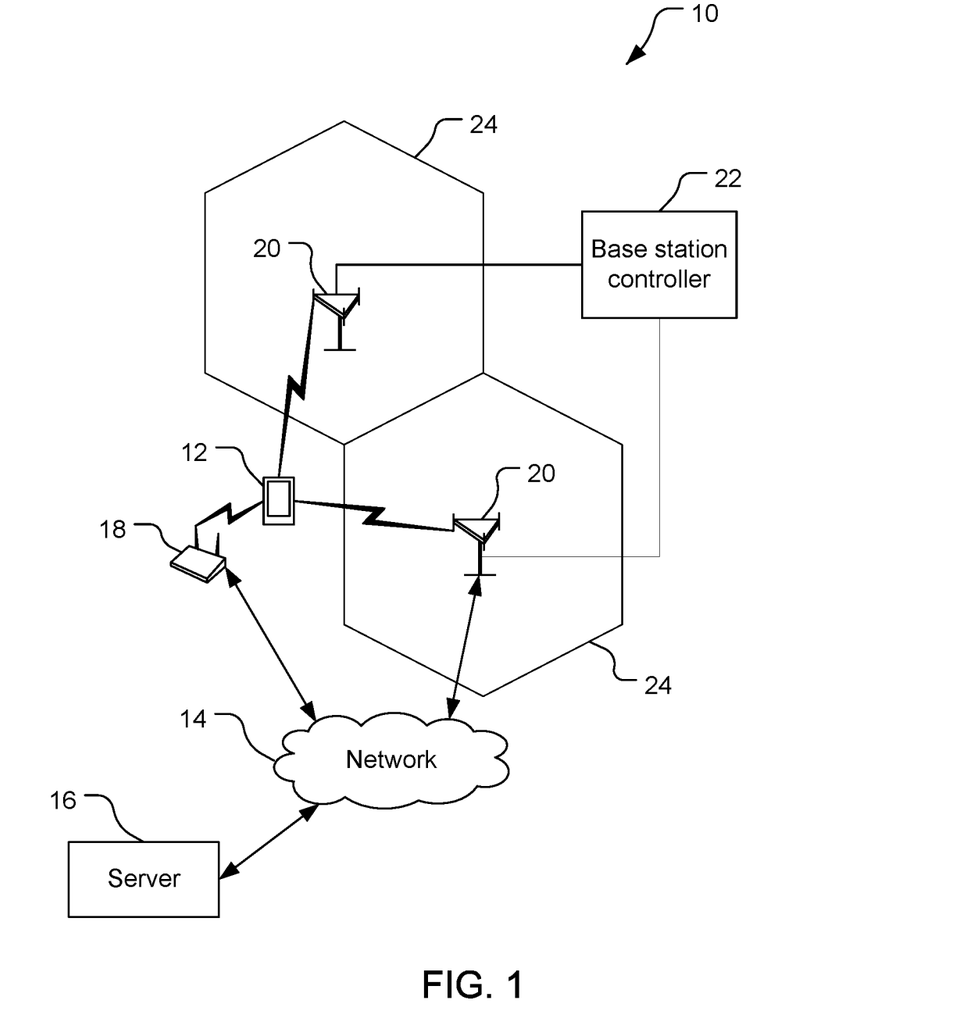
FIG. 1 is a simplified diagram of a communication system.

Referring to FIG. 1, a wireless communication system 10 includes mobile devices 12, a network 14, a server 16, an access point (AP) 18, base stations 20, and a base station controller (BSC) 22. The system 10 is a communication system in that components of the system 10 can communicate with one another directly or indirectly, e.g., via the network 14 and/or one or more of the access points 18 and/or one or more of the base stations 20. For example, the base stations 20 and the mobile device 12 may communicate using signals according to one or more protocols such as GSM, CDMA, or OFDM. While only one access point 18 is shown, the system 10 may include more than one access point 18. Also, while only one mobile device 12 is shown as a smart phone, more than one mobile device 12 may be used and other types of mobile devices may be used such as laptop computers, tablet computers, and/or mobile phones that are not smartphones. Still other mobile devices may be used, whether currently existing or developed in the future. The term "mobile devices" does not limit the mobile devices 12 to any particular form, protocol, etc. For example, the mobile devices 12 may be referred to by other names such as mobile terminals, user equipment, mobile stations, etc. Also, the term "base stations" does not limit the base stations 20 to any particular form, protocol, etc. For example, one or more of the base stations 20 may be referred to as a base transceiver station (BTS), an access node (AN), a Node B, an evolved Node B (eNB), etc. The BSC 22 is preferably hard-wired to the base stations 20 for bi-direction communication such that the BSC 22 can provide commands to the base stations 20. The base stations 20 may service separate cells 24 of a communication network, for example, neighboring cells of a communication network. Also, while only two base stations 20 are shown in FIG. 1, more than two base stations 20 will often be within communication range of the mobile device 12.

The base stations 20 may be configured to send pilot signals. For example, each of the base stations 20 may be configured to send a respective, distinct cell-specific reference signal (CRS). The CRS signals may be sent according to the orthogonal frequency-division multiplexed (OFDM) encoding technique. The base stations 20 will typically send a CRS pilot signal in every subframe while other signals may not be sent every subframe. Thus, the CRS pilot signals may be analyzed because they are reliably sent and because the mobile device 12 may already be collecting the CRS pilot signals. Analysis of the CRS pilot signals may thus use less power than analyzing one or more other signals, e.g., positioning reference signals (PRS), especially if the mobile device 12 would wake up specifically for the other signal(s) when the mobile device 12 is already waking up for the CRS pilot signals. The base stations 20 may vary the bandwidths of the respective CRS signals that the base stations send. For example, the base stations 20 may send a CRS pilot signal with a bandwidth of 20 MHz, 15 MHz, 10 MHz, 5 MHz, 3 MHz, 1.4 MHz.

The base stations 20 may change frequency bins used for one or more symbols used to send the respective CRS pilot signal. A set of frequency bins may, for example, form a contiguous block of frequencies around the center of the original bandwidth, or may be non-central frequency bins, and/or non-contiguous frequency bins. For example, a base station 20 may be configured to use a default bandwidth if the amount of traffic in the cell 24 of the base station 20 is unknown or is known to be high, e.g. with greater than 80% load, greater than 90% load, 100% load, or other load. The default bandwidth may be a maximum bandwidth setting, e.g., 20 MHz. Preferably, the base station 20 in any cell 24 with significant wireless traffic with the base station 20 will send the CRS pilot signal using a maximum bandwidth, e.g., 20 MHz, that the base station is configured to use to send the CRS pilot signal. The base station 20 may be configured to respond to the traffic in its cell 24 being low, e.g. with a single camped mobile device, by reducing the bandwidth used for the CRS pilot signal, e.g., from 20 MHz to 15 MHz, 10 MHz, 5 MHz, 3 MHz, 1.4 MHz, or some other bandwidth.

The base stations 20 are configured to repeatedly send their respective pilot signals. For example, each base station 20 may send an instance of the pilot signal once every 160 ms, 320 ms, 640 ms, or 1280 ms, with each instance of the pilot signal lasting, e.g., 1 ms. As discussed above, each base station 20 may change the bandwidth of the pilot signal, and thus consecutive instances of the pilot signal may have different bandwidths. The multiple instances of the pilot signal, possibly having different bandwidths, are referred to herein as the pilot signal. Thus, reference to the pilot signal includes, as appropriate, a single instance or multiple instances where the multiple instances may have different bandwidths. For example, reference to the pilot signal at different times includes multiple instances of the pilot signal, with at least one instance at each of the different times. Reference to the bandwidth of the pilot signal indicates the bandwidth of a particular instance of the pilot signal, e.g., at a particular time.

Figure 2:
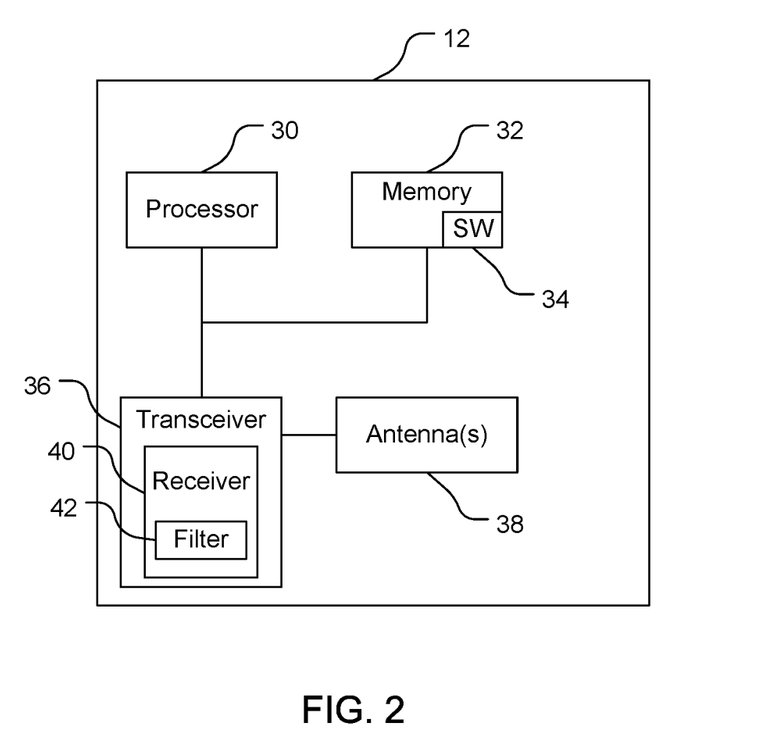
FIG. 2 is a simplified block diagram of components included in a mobile device shown in FIG. 1.

Referring to FIG. 2, the mobile device 12 comprises a computer system including a processor 30, memory 32 including software 34, a transceiver 36, and antennas 38. The transceiver 36 and antennas 38 form a wireless communication module that can communicate bi-directionally with the base stations 20 and with the access point 18 and/or one or more other entities. Thus, the antennas 38 include at least one antenna for communicating with the base stations 29 and at least one antenna for communicating with the access point 18. The transceiver 36 is configured to send and receive signals from and to the base stations and the access point 18 via appropriate antennas. The transceiver 36 includes a receiver 40 which in turn includes a filter 42. The processor 30 preferably includes an intelligent hardware device, e.g., a central processing unit (CPU) such as those made or designed by QUALCOMM®, ARMED, Intel® Corporation, or AMD®, a microcontroller, and/or an application specific integrated circuit (ASIC), etc. The processor 30 may comprise multiple separate physical entities that can be distributed in the mobile device 12. The memory 32 includes random access memory (RAM) and read-only memory (ROM). The memory 32 is a non-transitory processor-readable storage medium that stores the software 34 which is processor-readable, processor-executable software code containing processor-readable instructions that are configured to, when executed, cause the processor 30 to perform various functions described herein (although the description may refer only to the processor 30 performing the functions). Alternatively, the software 34 may not be directly executable by the processor 30 but configured to cause the processor 30, e.g., when compiled and executed, to perform the functions. The processor 30 is communicatively coupled to the memory 32 and the transceiver 36, including the receiver 40, and configured to perform a variety of functions, e.g., in accordance with the software 34.

With further reference to FIG. 1, the processor 30 is configured to determine a plurality of bandwidths of a pilot signal received from a base station 20 by the receiver 40 at different times. For example, the plurality of bandwidths of the pilot signal may include a first bandwidth corresponding to a first time at which the pilot signal is received and a second bandwidth corresponding to a second time at which the pilot signal is received, the second time being after the first time. The processor 30 and the memory 32, in particular the software 34, may be a means for determining a plurality of bandwidths of a pilot signal corresponding to different times at which the pilot signal is received by a mobile device 12 from a base station 20. The software 34 may include instructions configured to cause the processor 30 to determine a plurality of bandwidths of a pilot signal (corresponding to a plurality of instances of the pilot signal) received from a base station by a mobile device at different times. The processor 30 may determine the bandwidths by analyzing pilot signals sent by the base station 20 at different times. For example, the processor 30 may determine a characteristic of the pilot signal (e.g., signal to signal-plus-noise ratio (S/(S+N))) from channel energy responses (CERs) assuming increasingly larger bandwidths. The various bandwidths attempted may be from a known set of bandwidths that may be used by the base stations 20. The processor 30 may correlate the characteristic of the marginal (incremental) bandwidth with the characteristic of the total bandwidth of the immediately-prior assumed bandwidth. For example, the processor 30 may begin by correlating the characteristic using a center six resource blocks (RBs) of the pilot signal with the characteristic of a hypothesis bandwidth corresponding to more RBs, e.g., 15 centered RBs minus the six center RBs, etc. The processor 30 may proceed with multiple bandwidth hypotheses until the bandwidth is determined. The processor 30 may determine the bandwidth to be the maximum bandwidth if the maximum bandwidth is reached with a correlation above a threshold, or the bandwidth of the immediately-prior assumed bandwidth whenever the correlation drops below the threshold. Such a blind-search technique for determining bandwidth is disclosed in United States Patent Application Publication Number 2015/0071092. The processor 30 may be able to determine the bandwidth at a given time using a single instance of the pilot signal, or may use multiple instances of the pilot signal (i.e., the pilot signal may be sent periodically and the processor 30, with each sending being an instance of the pilot signal). In the unlikely event that the processor 30 analyzes multiple instances of the pilot signal to determine a single bandwidth, and the bandwidths of the multiple instances are different, then the processor 30 may determine the bandwidth to be the bandwidth of the last-used instance, or the processor 30 may conclude that there is an error (that the bandwidth is indeterminate from the analyzed instances) and may attempt to re-determine the bandwidth. The processor 30 is preferably configured to determine bandwidths of pilot signals in the order of the times of receipt of the pilot signals (e.g., for pilot signal instances in the order in which the pilot signal instances are received) by the mobile device 12. In this case, more-recently determined bandwidths correspond to the bandwidths of the pilot signal at more-recent receipt times for which bandwidths are determined, with the most-recently determined bandwidth corresponding to the bandwidth of the pilot signal at the most-recent time of receipt of the pilot signal for which a bandwidth is determined (e.g., the most-recently-received pilot signal instance for which a bandwidth is determined).

The receiver 40 is configured to receive pilot signals of different bandwidths. The receiver 40 may receive signals of any bandwidth, but may poorly receive signals that are of greater bandwidth than a bandwidth of the receiver 40, or signals of a lower bandwidth than a bandwidth of the receiver if there is noise in the differential bandwidth between the bandwidth of the signal and the bandwidth of the receiver 40. The filter 42 is configured to provide a bandwidth setting of the receiver 40, to filter signals received by the receiver 40 according to a set bandwidth. The bandwidth of the filter 42 may be set to different bandwidths, e.g., by selecting one or more different filtering characteristic values (e.g., by selecting one or more components with different characteristic values, e.g., inductance, resistance, or capacitance) of a circuit to filter the pilot signal in analog form. For example, the filter 42 is configured to filter a pilot signal according to a determined bandwidth. For example, the processor 30 may determine the bandwidth of the pilot signal from each base station at multiple times. The filter 42 may be configured to filter the pilot signal from a base station 20 using a bandwidth of the pilot signal at a more-recent time of receipt of the pilot signal for which a bandwidth is determined, and preferably a bandwidth of the pilot signal at a most-recent time of receipt (e.g., a most-recently-received instance) of the pilot signal for which a bandwidth is determined. The filter 42 may be configured to filter the pilot signal for a particular bandwidth (e.g., select one or more filter components) in response to a command from the processor 30 to set the filter 42 to the particular bandwidth. The receiver 40 may be configured to digitize received signals including the pilot signal (i.e., convert the pilot signal from analog to digital). Further, the filter 42 may be configured to filter a digitized, but unfiltered, pilot signal digitally, e.g., with the filter 42 including a processor for signal processing the digitized pilot signal.

Referring again to the processor 30, the processor 30 may determine the bandwidths of the pilot signals from the base stations 20 in other ways. For example, the processor 30 may determine the bandwidth of a pilot signal of a base station 20 by receiving an indication of the bandwidth from the base station 20. As other examples, the processor 30 may determine the bandwidth of a pilot signal of a base station by receiving an indication of the bandwidth from the server 16, with the server 16 determining the bandwidth, e.g., as discussed above using correlation of a signal characteristic, being informed by the base stations 20, etc.

The processor 30 may be configured to filter a pilot signal, e.g., using a bandwidth of the pilot signal at a more-recent time of receipt of the pilot signal for which a bandwidth is determined. Continuing the example from above, the processor 30 may be configured to filter the pilot signal using the second bandwidth. The processor 30 and the memory 32, in particular the software 34, and possibly the receiver 40 may be a means for filtering the pilot signal by the mobile device using a bandwidth of the pilot signal at a more-recent time of receipt of the pilot signal for which a bandwidth is determined. The software 34 may include instructions configured to cause the processor 30 to filter the pilot signal using a bandwidth of the pilot signal at a more-recenttime of receipt of the pilot signal for which a bandwidth is determined. If the processor 30 is configured to determine the bandwidth of times of receipt of the pilot signal chronologically, then the bandwidth of the pilot signal at the more-recent time of receipt of the pilot signal for which a bandwidth is determined is a more-recently-determined bandwidth and a bandwidth of the pilot signal at a most-recent time of receipt of the pilot signal for which a bandwidth is determined is a most-recently-determined bandwidth. The processor 30 may filter the pilot signal by causing the receiver 40 to filter the pilot signal, e.g., by causing the filter to set a particular bandwidth (e.g., by setting one or more filter components as discussed below). Alternatively, the processor 30 may filter the pilot signal by digitally processing the pilot signal, e.g., after having been digitized by the receiver 40.

The processor 30 is further configured to determine a positioning parameter from the pilot signal filtered using the determined bandwidth, preferably the bandwidth corresponding to a more-recent time of receipt of the pilot signal for which a bandwidth is determined. Continuing the example from above, the processor is configured to determine the positioning parameter from the pilot signal filtered using the second bandwidth. The processor 30 and the memory 32, in particular the software 34, may be a means for determining a positioning parameter from the pilot signal filtered using the bandwidth corresponding to a more-recent time of receipt of the pilot signal for which a bandwidth is determined. The software 34 may include instructions configured to cause the processor 30 to determine a positioning parameter from the pilot signal filtered using the bandwidth corresponding to a more-recent time of receipt of the pilot signal for which a bandwidth is determined. The processor 30 may be configured to correlate the pilot signal with a known signal pattern for each base station 20 to determine from which base station 20 the pilot signal originated. The processor 30 may use the time of arrival of the signal, along with information regarding transmission time of the signal from the base station 20 to determine the pseudorange between the base station 20 to the mobile device 12. Also or alternatively, the processor 30 may use a power of the received pilot signal and knowledge (e.g., provided by the base station 20 or known independently, e.g., a standard value) of a transmission power of the pilot signal to determine a distance from the base station 20 to the mobile device 12. The pseudorange and/or the power reduction in the pilot signal, in combination with the location of the base station 20, may be the positioning parameter.

The processor 30 is further configured to determine a position of the mobile device using the positioning parameter. The processor 30 and the memory 32, in particular the software 34, may be a means for determining a position of the mobile device using the positioning parameter. The software 34 may include instructions configured to cause the processor 30 to determine a position of the mobile device using the positioning parameter. The processor 30 may be configured to use the time of travel of the pilot signal, or the distance from the base station 20, and a known location of the base station 20 to help determine the position of the mobile device 12. For example, the processor 30 may perform multilateration using the distances from multiple base stations 20 to the mobile device 12 and the respective locations of the base stations 20 to determine the position (or a position estimate) of the mobile device 12. The position, or position estimate, may be a geographic location (e.g., point) or geographic area, or other indication of position (e.g., an identity of an area such as a store name).

Figure 3:
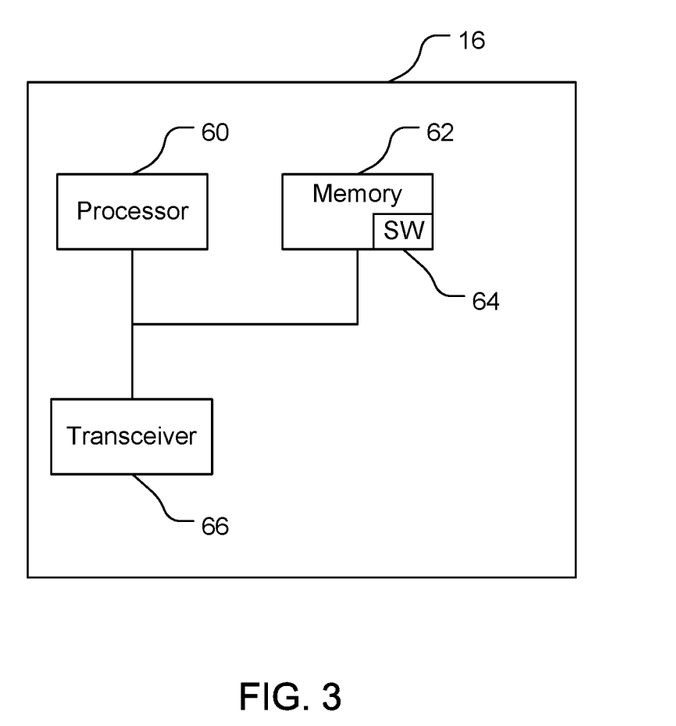
FIG. 3 is a simplified block diagram of components included in a server shown in FIG. 1.

Referring to FIG. 3, with further reference to FIGS. 1-2, the server 16 comprises a computer system including a processor 60, memory 62 including software 64, and a transceiver 66. The processor 60 preferably includes an intelligent hardware device, e.g., a central processing unit (CPU) such as those made or designed by QUALCOMM®, ARM®, Intel® Corporation, or AMD®, a microcontroller, and/or an application specific integrated circuit (ASIC), etc. The processor 60 may comprise multiple separate physical entities that can be distributed in the server 16. The memory 62 may include random access memory (RAM) and/or read-only memory (ROM). The memory 62 is a non-transitory, processor-readable storage medium that stores the software 64 which is processor-readable, processor-executable software code containing instructions that are configured to, when performed, cause the processor 60 to perform various functions described herein (although the description may refer only to the processor 60 performing the functions). The software 64 may not be directly executable by the processor 60 and instead may be configured to, for example when compiled and executed, cause the processor 60 to perform the functions. Whether needing compiling or not, the software 64 contains the instructions to cause the processor 60 to perform the functions. The processor 60 is communicatively coupled to the memory 62. The processor 60 in combination with the memory 62 may provide means for performing functions as described herein The transceiver 66 is communicatively coupled to the processor 60 and configured to send communications to and receive communications from the network 14 in order to send communications to and receive communications from the base stations 20. Also or alternatively, the transceiver 66 may be configured to send communications to and receive communications from the base stations 20 directly, or at least through one or more paths not going through the network 14.

The server 16 may be configured to perform one or more of the functions discussed above that the mobile device 12 may perform. The processor 60 may be configured to determine pilot signal bandwidth, and/or filter a pilot signal, and/or determine a positioning parameter, and/or determine mobile device position using the positioning parameter. The processor 60, in accordance with the software 64, may be configured to perform one or more of these functions as discussed above with respect to the processor 30. To perform any of these functions, the server 16 is configured to receive appropriate information. For example, to determine pilot signal bandwidth, the server 16 may receive information as to (S/(S+N)) values, or from which such values may be calculated, of a pilot signal received by the mobile device 12. As another example, in order to filter a pilot signal the server 16 may be configured to receive a digitized version of the pilot signal and the processor 60 configured to signal process this digitized version to filter the pilot signal. The processor 60 may filter the signal using bandwidths determined by the processor 60 and/or as indicated by the mobile device 12. As another example, in order to determine the positioning parameter, the server 16 may receive information regarding the timing of a pilot signal from a base station 20, and preferably the identity and/or location of the base station 20, and/or may receive the signal itself relayed by the mobile device 12. As another example, to determine the mobile device position, the server 16 may be configured to receive the positioning parameter and base station identity and/or location for multiple base stations 20 and the processor 60 configured to perform multilateration to determine a position (or position estimate) of the mobile device 12. Thus, the processor 60 in combination with the software 64 as appropriate may comprise at least part of means for determining bandwidths of a pilot signal, means for filtering the pilot signal, means for determining a positioning parameter, and/or means for determining a position of the mobile device 12.

Figure 4:
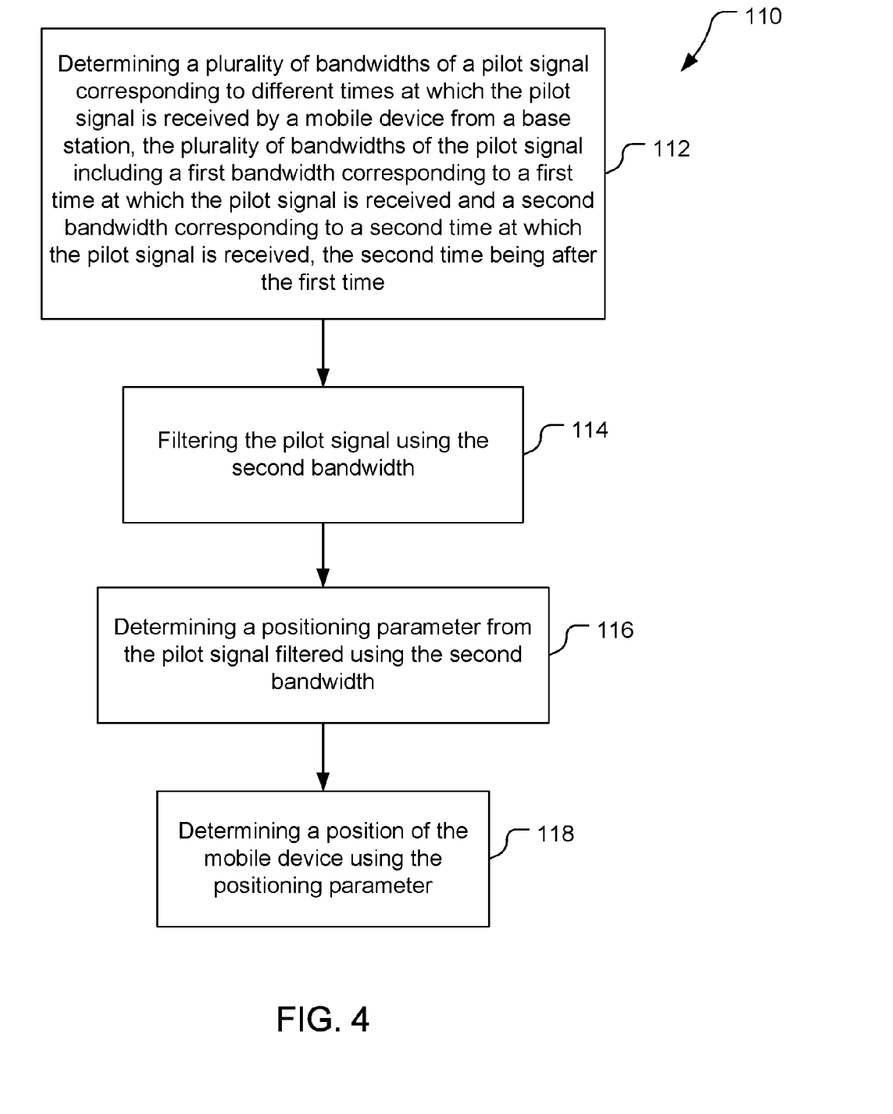
FIG. 4 is a block flow diagram of an example process of mobile device position determination.

Referring to FIG. 4, with further reference to FIGS. 1-3, a process 110 of mobile device position determination includes the stages shown. The process 110 is, however, an example only and not limiting. The process 110 can be altered, e.g., by having stages added, removed, rearranged, combined, performed concurrently, and/or having single stages split into multiple stages.

At stage 112, the process 110 includes determining a plurality of bandwidths of a pilot signal corresponding to different times at which the pilot signal is received by a mobile device from a base station, the plurality of bandwidths of the pilot signal including a first bandwidth corresponding to a first time at which the pilot signal is received and a second bandwidth corresponding to a second time at which the pilot signal is received, the second time being after the first time. The mobile device 12 may receive multiple instances, at different times, of a pilot signal from a base station 20 and determine the bandwidths of the pilot signal at the different times. For example, determining the first plurality of bandwidths of the first pilot signal may comprise measuring the first pilot signal to obtain a measured pilot signal and analyzing the measured pilot signal. Measuring the first pilot signal may comprise filtering the first pilot signal using different bandwidths to obtain a plurality of filtered pilot signals and the analyzing may comprise correlating at least one pair of the plurality of filtered pilot signals. As discussed above, the mobile device 12 may filter the pilot signal using different bandwidth hypotheses and correlate a characteristic, e.g., (S/(S+N)), of the signal with the different hypotheses to determine the bandwidth of the pilot signal. Also or alternatively, the mobile device 12 may receive indications of the bandwidths corresponding to the different times. For example, the server 16 may determine the bandwidths from information received from the mobile device 12 and send indications of the bandwidths to the mobile device 12. The bandwidths of pilot signals from multiple base stations 20 may be determined.

At stage 114, the process 110 includes filtering the pilot signal using the second bandwidth. The mobile device 12 may filter one or more incoming instances of the pilot signal using the determined bandwidth of one of the later-received pilot signal instances for which a bandwidth is determined (i.e., not the first-received pilot signal instance for that base station 20). Preferably, the determined bandwidth of the last-received (most-recently-received) instance of the pilot signal for which a bandwidth is determined is used to filter incoming instances of the pilot signal. If bandwidths of pilot signal instances are determined in the order in which the instances are received, then the most-recently determined bandwidth corresponds to the bandwidth of the most-recently-received pilot signal for which a bandwidth is determined. Preferably, the most-recently-determined bandwidth is used to filter incoming pilot signal instances. To filter incoming pilot signal instances, the filter 42 may apply an analog filter to the incoming pilot signal or the processor 30 may digitally filter a digitized version of the pilot signal. Also or alternatively, the server 16 may filter the pilot signal, e.g., if the mobile device 12 sends the digitized version of the pilot signal to the server 16.

At stage 116, the process 110 includes determining a positioning parameter from the pilot signal filtered using the second bandwidth. The pilot signal is filtered using the bandwidth of a more-recent time of receipt of the pilot signal (e.g., a more-recently-received pilot signal instance) for which a bandwidth is determined (e.g., a more-recently-determined bandwidth of the plurality of bandwidths of the pilot signal). The pilot signal filtered using this bandwidth may be referred to as a filtered pilot signal. The processor 30 of the mobile device 12 may analyze the filtered pilot signal to determine a positioning parameter. For example, as discussed above, the processor 30 may determine a distance between the mobile device and the base station 20, e.g., by determining a travel time of the pilot signal from a time of arrival of the pilot signal and knowledge of a transmission time of the pilot signal from the base station 20, or from a power level of the received pilot signal and knowledge of the transmission power of the pilot signal. Also or alternatively, the server 16 may determine the positioning parameter, e.g., if the appropriate information is transmitted to and/or known by the server (e.g., the arrival time being transmitted to the server 16 and the transmission time being known or determinable by the server 16). A positioning parameter other than distance from the mobile device 12 to the base station 20 may be determined.

At stage 118, the process 110 includes determining a position of the mobile device using the positioning parameter. The processor 30 of the mobile device 12 may determine a position of the mobile device 12 by determining possible positions based on the known location of the base station 20 and a determined distance from the base station 20 of the mobile device 12. The processor 30 combine positioning parameter and known location for multiple base stations 20 using one or more multilateration techniques to refine the determined position of the mobile device 12. Also or alternatively, the processor 60 of the server 16 may perform one or more of the functions for determining the mobile device position.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include that the information is conveyed from a sending entity but does not reach an intended recipient of the information. The intended recipient, even though not actually receiving the information, may still be referred to as a receiving entity, e.g., a receiving execution environment.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A mobile device position determination method comprising:
    determining a plurality of bandwidths of a pilot signal corresponding to different times at which the pilot signal is received by a mobile device from a base station, the plurality of bandwidths of the pilot signal including a first bandwidth corresponding to a first time at which the pilot signal is received and a second bandwidth corresponding to a second time at which the pilot signal is received, the second time being after the first time;
    filtering the pilot signal using the second bandwidth;
    determining a positioning parameter from the pilot signal filtered using the second bandwidth; and
    determining a position of the mobile device using the positioning parameter.

2. The method of claim 1, wherein the base station is a first base station, the pilot signal is a first pilot signal, the plurality of bandwidths of the pilot signal is a first plurality of bandwidths of the first pilot signal, and the positioning parameter is a first positioning parameter, the method further comprising:
    determining a second plurality of bandwidths of a second pilot signal corresponding to different times at which the second pilot signal is received by the mobile device from a second base station, the second plurality of bandwidths of the second pilot signal including a third bandwidth corresponding to a third time at which the second pilot signal is received and a fourth bandwidth corresponding to a fourth time at which the second pilot signal is received, the fourth time being after the third time;

filtering the second pilot signal by the mobile device using the fourth bandwidth; and determining a second positioning parameter from the second pilot signal filtered using the fourth bandwidth;

wherein determining the position of the mobile device further includes using the second positioning parameter.

3. The method of claim 2, wherein determining the first plurality of bandwidths of the first pilot signal comprises:

measuring the first pilot signal to obtain a measured pilot signal; and analyzing the measured pilot signal.

4. The method of claim 3, wherein measuring the first pilot signal comprises filtering the first pilot signal using different bandwidths to obtain a plurality of filtered pilot signals and wherein the analyzing comprises correlating at least one pair of the plurality of filtered pilot signals.

5. The method of claim 1, wherein the pilot signal is an orthogonal frequency-division multiplexed (OFDM) cell-specific reference signal (CRS).

6. The method of claim 1, wherein the plurality of bandwidths of the pilot signal includes at least one further bandwidth corresponding to at least one further time, the at least one further bandwidth being other than the first bandwidth or the second bandwidth, and the second time being a most recent time of the first time, the second time, and the at least one further time.

7. A mobile device comprising:

a receiver configured to receive pilot signals of different bandwidths;

a processor communicatively coupled to the receiver and configured to:

determine a plurality of bandwidths of a pilot signal received from a base station by the receiver at different times, the plurality of bandwidths of the pilot signal including a first bandwidth corresponding to a first time at which the pilot signal is received and a second bandwidth corresponding to a second time at which the pilot signal is received, the second time being after the first time;

filter the pilot signal using the second bandwidth;

determine a positioning parameter from the pilot signal filtered using the second bandwidth; and determine a position of the mobile device using the positioning parameter.

8. The mobile device of claim 7, wherein the base station is a first base station, the pilot signal is a first pilot signal, the plurality of bandwidths of the pilot signal is a first plurality of bandwidths of the pilot signal, and the positioning parameter is a first positioning parameter, the receiver being configured to receive pilot signals from the first base station and a second base station that is physically separate from the first base station, the processor being further configured to:

determine a second plurality of bandwidths of a second pilot signal corresponding to different times at which the second pilot signal is received by the mobile device from the second base station, the second plurality of bandwidths of the second pilot signal including a third bandwidth corresponding to a third time at which the second pilot signal is received and a fourth bandwidth corresponding to a fourth time at which the second pilot signal is received, the fourth time being after the third time;

filter the second pilot signal using the fourth bandwidth; and determine a second positioning parameter from the second pilot signal filtered using the fourth bandwidth;

wherein to determine the position of the mobile device, the processor is further configured to use the second positioning parameter.

9. The mobile device of claim 8, wherein to determine the first plurality of bandwidths of the first pilot signal, the processor is configured to analyze a characteristic of the first pilot signal.

10. The mobile device of claim 9, wherein to determine the first plurality of bandwidths of the first pilot signal, the processor is configured to:

filter the first pilot signal using at least two predetermined bandwidths to produce at least two filtered signals;

determine the characteristic of the at least two filtered signals; and correlate the characteristic of each filtered signal of at least one pair of the at least two filtered signals.

11. The mobile device of claim 7, wherein the pilot signal is an orthogonal frequency-division multiplexed (OFDM) cell-specific reference signal (CRS).

12. The mobile device of claim 7, wherein the plurality of bandwidths of the pilot signal includes at least one further bandwidth corresponding to at least one further time, the at least one further bandwidth being other than the first bandwidth or the second bandwidth, and the second time being a most recent time of the first time, the second time, and the at least one further time.

13. A non-transitory processor-readable storage medium storing processor-readable instructions configured to cause a processor to:

determine a plurality of bandwidths of a pilot signal received from a base station by a mobile device at different times, the plurality of bandwidths of the pilot signal including a first bandwidth corresponding to a first time at which the pilot signal is received and a second bandwidth corresponding to a second time at which the pilot signal is received, the second time being after the first time;

filter the pilot signal using the second bandwidth;

determine a positioning parameter from the pilot signal filtered using the second bandwidth; and determine a position of the mobile device using the positioning parameter.

14. The storage medium of claim 13, wherein the base station is a first base station, the pilot signal is a first pilot signal, the plurality of bandwidths of the pilot signal is a first plurality of bandwidths of the pilot signal, and the positioning parameter is a first positioning parameter, the instructions further comprising instructions configured to cause the processor to:

determine a second plurality of bandwidths of a second pilot signal corresponding to different times at which the second pilot signal is received by the mobile device from a second base station physically separate from the first base station, the second plurality of bandwidths of the second pilot signal including a third bandwidth corresponding to a third time at which the second pilot signal is received and a fourth bandwidth corresponding to a fourth time at which the second pilot signal is received, the fourth time being after the third time;

filter the second pilot signal using the fourth bandwidth; and determine a second positioning parameter from the second pilot signal filtered using the fourth bandwidth;

wherein to determine the position of the mobile device, the processor is further configured to use the second positioning parameter.

15. The storage medium of claim 14, wherein to determine the first plurality of bandwidths of the first pilot signal, the instructions include instructions configured to cause the processor to analyze a characteristic of the first pilot signal.

16. The storage medium of claim 15, wherein to determine the first plurality of bandwidths of the first pilot signal, the instructions include instructions configured to cause the processor to:

filter the first pilot signal using at least two predetermined bandwidths to produce at least two filtered signals;

determine the characteristic of the at least two filtered signals; and correlate the characteristic of each filtered signal of at least one pair of the at least two filtered signals.

17. The storage medium of claim 13, wherein the pilot signal is an orthogonal frequency-division multiplexed (OFDM) cell-specific reference signal (CRS).

18. The storage medium of claim 13, wherein the plurality of bandwidths of the pilot signal includes at least one further bandwidth corresponding to at least one further time, the at least one further bandwidth being other than the first bandwidth or the second bandwidth, and the second time being a most recent time of the first time, the second time, and the at least one further time.

19. A system comprising:

means for determining a plurality of bandwidths of a pilot signal corresponding to different times at which the pilot signal is received by a mobile device from a base station, the plurality of bandwidths of the pilot signal including a first bandwidth corresponding to a first time at which the pilot signal is received and a second bandwidth corresponding to a second time at which the pilot signal is received, the second time being after the first time;

means for filtering the pilot signal by the mobile device using the second bandwidth;

means for determining a positioning parameter from the pilot signal filtered using the second bandwidth; and means for determining a position of the mobile device using the positioning parameter.

20. The system of claim 19, wherein the base station is a first base station, the pilot signal is a first pilot signal, the plurality of bandwidths of the pilot signal is a first plurality of bandwidths of the pilot signal, and the positioning parameter is a first positioning parameter, the system further comprising:

means for determining a second plurality of bandwidths of a second pilot signal corresponding to different times at which the second pilot signal is received by the mobile device from a second base station, the second plurality of bandwidths of the second pilot signal including a third bandwidth corresponding to a third time at which the second pilot signal is received and a fourth bandwidth corresponding to a fourth time at which the second pilot signal is received, the fourth time being after the third time;

means for filtering the second pilot signal by the mobile device using the fourth bandwidth; and means for determining a second positioning parameter from the second pilot signal filtered using the fourth bandwidth;

wherein the means for determining the position of the mobile device use the second positioning parameter.

21. The system of claim 20, wherein the means for determining the first plurality of bandwidths of the first pilot signal comprise:

means for measuring the first pilot signal to obtain a measured pilot signal; and means for analyzing, at the mobile device, the measured pilot signal.

22. The system of claim 21, wherein at least one of the means for measuring or the means for analyzing comprise means for filtering the first pilot signal using different bandwidths to obtain a plurality of filtered pilot signals, and wherein the means for analyzing comprise means for correlating at least one pair of the plurality of filtered pilot signals.

23. The system of claim 19, wherein the pilot signal is an orthogonal frequency-division multiplexed (OFDM) cell-specific reference signal (CRS).

24. The system of claim 19, wherein the plurality of bandwidths of the pilot signal includes at least one further bandwidth corresponding to at least one further time, the at least one further bandwidth being other than the first bandwidth or the second bandwidth, and the second time being a most recent time of the first time, the second time, and the at least one further time.

* * * * *